UNITED STATES PATENT OFFICE.

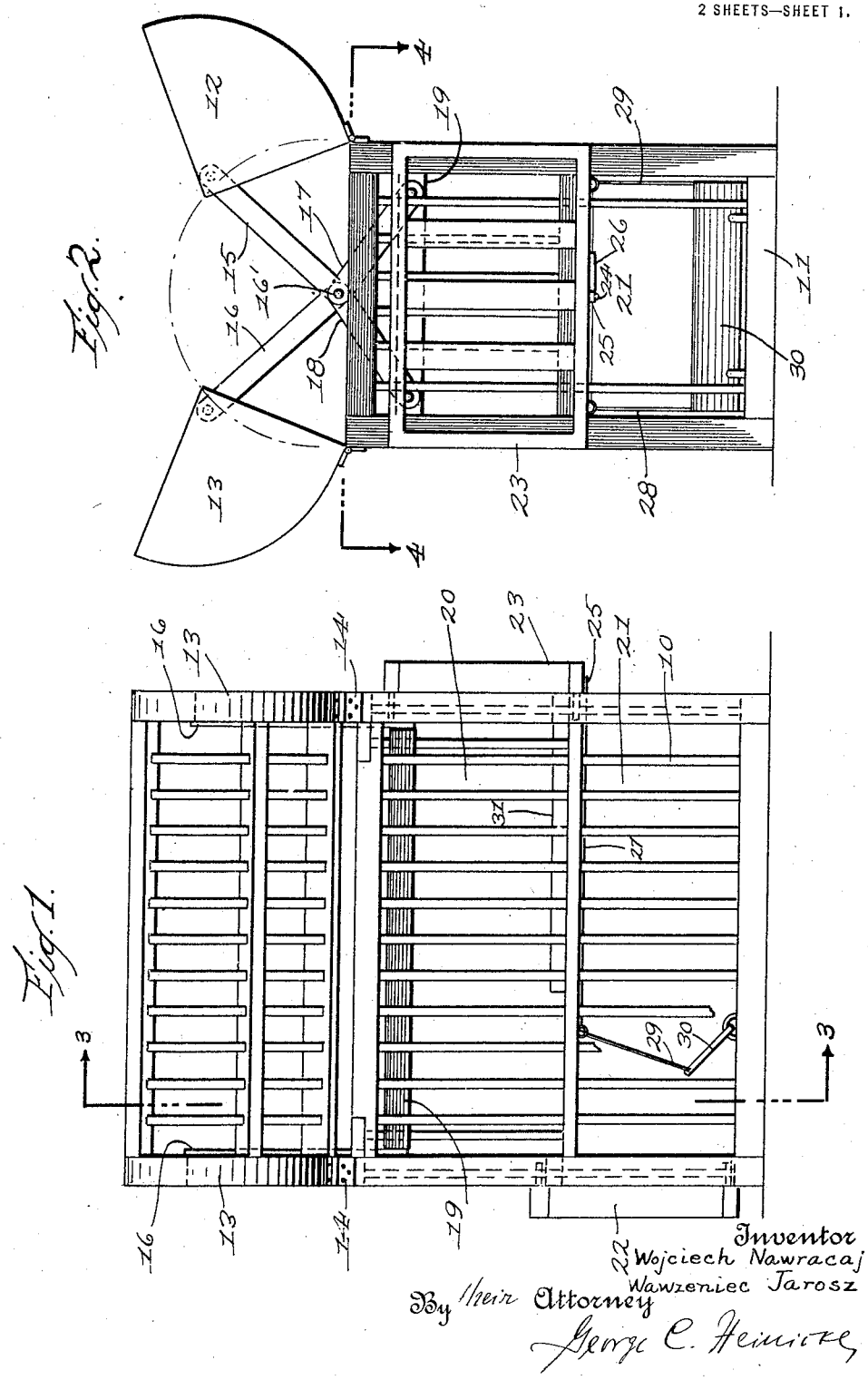

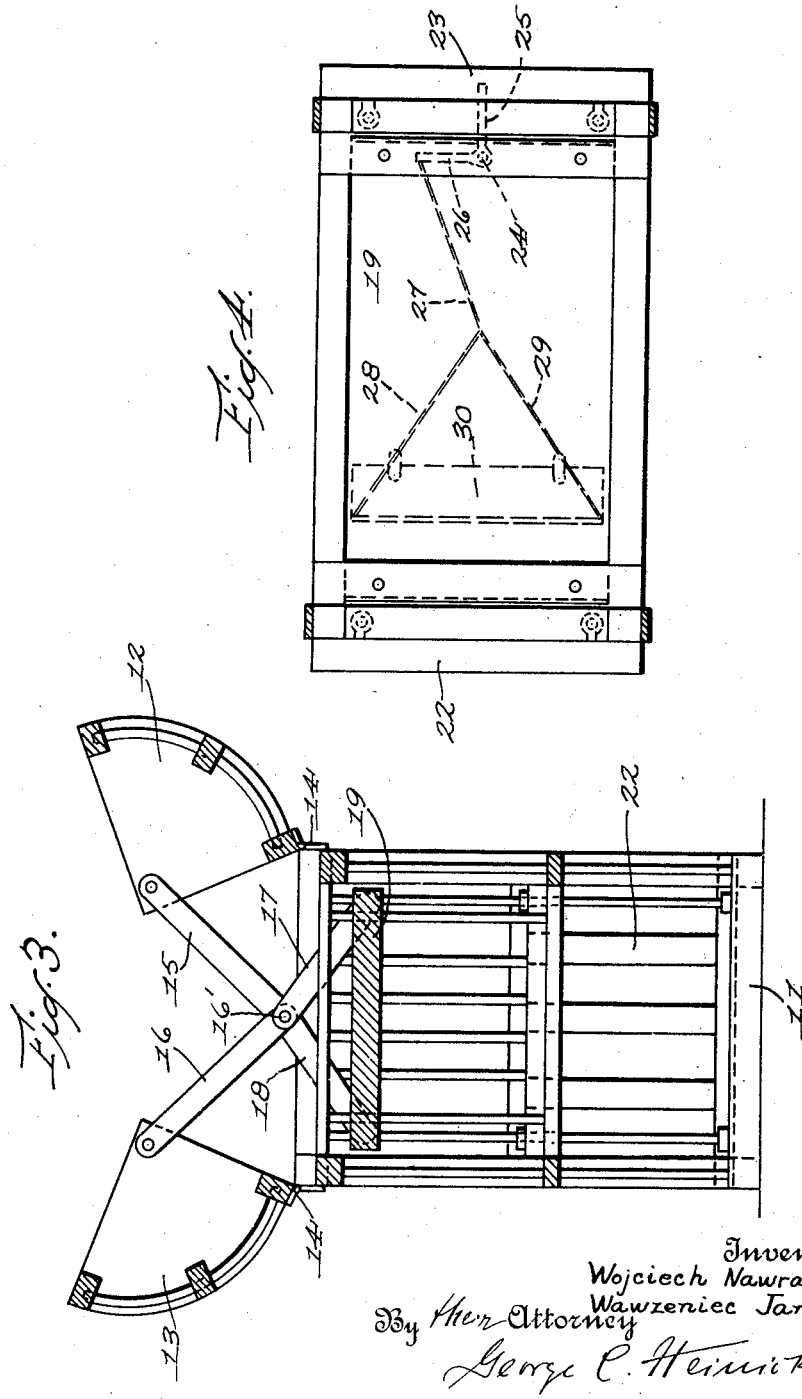

WOJCIECH NAWRACAJ AND WAWZENIEC JAROSZ, OF HAMTRAMCK, MICHIGAN.

ANIMAL AND BIRD TRAP.

1,391,489.  Specification of Letters Patent.  Patented Sept. 20, 1921.

Application filed February 19, 1921. Serial No. 446,407.

*To all whom it may concern:*

Be it known that I, WOJCIECH NAWRACAJ, a citizen of U. S. A., residing at Hamtramck, county of Wayne, and State of Michigan, and I, WAWZENIEC JAROSZ, a citizen of Poland, residing at Hamtramck, county of Wayne, and State of Michigan, have invented certain new and useful Improvements in Animal and Bird Traps, of which the following is a specification.

Our invention relates to improvements in traps, and it is the principal object of the invention to provide a combined trap for birds and other animals such as rats and mice or similar quadrupeds.

A further object of the invention is the provision of a trap of this kind which is adapted to be operated by the animals to automatically close the trap and cut off their retreat.

With these and various other objects in view our invention has relation to certain features of construction and operation, an example of which is described in the following description and illustrated in the accompanying drawing, wherein:—

Figure 1 is a side elevation of a trap constructed according to the present invention.

Fig. 2 is an end elevation thereof.

Fig. 3 is a vertical section on line 3—3 of Fig. 1, and

Fig. 4 is a top plan view looking down along the line 4—4 of Fig. 2.

Referring now more particularly to the drawings, wherein like letters of reference designate similar parts in all the figures, 10 designates a cage having a base 11 and a cover which is composed of two segmental elements or members 12 and 13, secured at their lower outer ends by means of the hinges 14 to the top rail of the cage. The outer walls of the segmental elements form substantially a continuation of the cage, and to the lower inner edges of these elements, links 15 and 16 are pivotally secured, the lower ends of which are connected by a pin 16', forming the pivot point of the upper ends of links 17 and 18 secured with their lower ends to the outer ends of a movable bottom plate 19, adapted to be moved down into the upper compartment 20 of the cage under the weight of a bird alighting on plate 19.

The ends of the lower compartment 21 are closed by the vertical sliding trap doors 22 and 23 respectively, the door 23 of which is held in its upper, open position by a bell-crank lever 24 pivoted on one of the cage bars and supporting with its outer arm 25, the lower bar of the trap door 23 while to the end of its inner arm 26, a cable 27 is attached, the branches 28 and 29 of which are secured to the ends of a step 30, transversely arranged within the lower compartment 21 and pivotally secured with its lower edge to the bottom plate 11. This step is normally held in inclined position by the cable 27.

The other sliding trap door 22 is adapted to be opened by raising it by hand, in order to remove the animals trapped in the lower compartment, while a door 31 in the side wall of the upper compartment 20 is used for the removal of the entrapped birds.

In operation, a bird alighting on plate 19 attracted by the bait placed upon the same, will depress the same and will automatically close the segmental elements forming the cover by means of their pivoted link connection on the upper compartment, as indicated by the dotted lines in Fig. 2, entrapping the bird which then may be removed through the side door 31.

An animal of the rodent type lured by a bait behind the step 30, will depress the same by its own weight and operate the bell-crank lever by means of the cables so that the trap door 23 losing its support 25, will drop by its own weight entrapping the animal, which then may be removed through trap door 22.

It is evident that the construction shown, illustrates only the preferred form of our invention, and that changes may be made in the general arrangement and in the construction of the minor details without deviating from the spirit and scope of our invention, and we do not therefore wish to limit ourselves to the use of such forms as shown.

Having thus described our invention, we claim as new and desire to secure by Letters Patent of the United States is:

In a combined bird and quadruped animal trap, a compartmented cage, a bi-partite cover for said cage, a movable bottom plate for the upper compartment, means connecting said bottom plate with the parts of said cover, adapted to close the cover over a bird alighting on said plate, and means in the lower compartment for entrapping quadruped animals.

In testimony whereof we have affixed our signatures.

WOJCIECH NAWRACAJ.
WAWZENIEC JAROSZ.